US007701646B2

(12) United States Patent
Koyama

(10) Patent No.: US 7,701,646 B2
(45) Date of Patent: Apr. 20, 2010

(54) LENS BARREL

(75) Inventor: Terunori Koyama, Sagamiwara (JP)

(73) Assignee: Ricoh Company, Ltd., Tokyo (JP)

( * ) Notice: Subject to any disclaimer, the term of this patent is extended or adjusted under 35 U.S.C. 154(b) by 108 days.

(21) Appl. No.: 12/098,152

(22) Filed: Apr. 4, 2008

(65) Prior Publication Data

US 2008/0291556 A1    Nov. 27, 2008

(30) Foreign Application Priority Data

Apr. 4, 2007    (JP) .............................. 2007-098242

(51) Int. Cl.
    *G02B 15/14*    (2006.01)
(52) U.S. Cl. ...................... 359/700; 359/701; 359/704; 359/699
(58) Field of Classification Search ................. 359/700, 359/701, 704, 696
    See application file for complete search history.

(56) References Cited

U.S. PATENT DOCUMENTS 5,144,493 A * 9/1992 Nomura ...................... 359/700
5,731,913 A * 3/1998 Imanari ...................... 359/700
5,886,836 A * 3/1999 Sasaki et al. ................ 359/823

FOREIGN PATENT DOCUMENTS

| JP | 09-230192 | 9/1997 |
| JP | 2864363 | 12/1998 |
| JP | 2003-344744 | 12/2003 |

* cited by examiner

*Primary Examiner*—Joseph Martinez
(74) *Attorney, Agent, or Firm*—Oblon, Spivak, McClelland, Maier & Neustadt, L.L.P.

(57) ABSTRACT

A lens barrel is provided. The lens barrel includes a first cylinder that includes at least one continuous groove on an interior surface thereof. The at least one continuous groove includes a trough of a helicoidal screw and a circumferential groove formed in a circumferential direction with respect to the first cylinder and formed in continuation with the trough of the helicoidal screw. The lens barrel also includes a second cylinder that includes a crest of a helicoidal screw that engages with the trough of the helicoidal screw and the circumferential groove and that is formed on outer circumference of the second cylinder. The crest of the helicoidal screw is formed of first material. A part of the crest of the helicoidal screw includes a reinforcement structure formed of a second material that is a different material from the first material.

20 Claims, 5 Drawing Sheets

LENS BARREL

CROSS REFERENCE TO RELATED APPLICATIONS

This application claims priority to and contains subject matter related to Japanese Patent Application No. 2007-098242 filed on Apr. 4, 2007, the entire contents of which are hereby incorporated by reference.

BACKGROUND OF THE INVENTION

1. Field of the Invention

A lens barrel that includes a lens in a body and an associated methodology of actuating the lens barrel in an appointed direction are provided. A camera, a digital camera, a portable information terminal and an image input device including the lens barrel are also provided.

2. Discussion of the Background

Whether a lens barrel is in a state in which it is loaded in a camera body or whether a lens barrel is in a state in which it is divided, as, for example, a single-lens reflex camera, by a camera body, the lens barrel might in either case be shocked if it is dropped by mistake, or if it collides with other things.

In a state in which the lens barrel is configured to photograph, for example, if a cam follower or a crest of a helicoidal screw of the lens barrel are compromised by a shock, or if a cam groove or a groove in a circumferential direction of the lens barrel are transformed by a shock, it may make it more difficult to smoothly operate a transfer of the taking lens which is performed by the cam follower and the cam groove or by the crest of a helicoidal screw and the groove in a circumference direction.

Japanese registration patent 3,288,918 (Japanese Patent Publication No. 09-230192) describes that because an end of side after a cam groove of a cylindrical member has a shocked aspect, a cam follower that is made from a ring member and a metallic pin, it can be prevented from damaging at the time of a shock.

Japanese Patent Publication No. 2003-344744 describes that because a tip inside of a cam groove of a cylindrical member holds a metal reinforcement link, it can be prevented from being damaged at the time of a shock.

Japanese registration patent 2,864,363 (Japanese Patent Publication No. 08-211272) describes that it makes dampen power added to a moving frame through two supporting member and it is includes a guide pin.

However, although the above-noted documents describe the cam follower and the reinforcement of the cam groove, they do not describe a prevention of destruction when a crest of a helicoidal screw on the lens barrel is shocked in an optical axis direction.

SUMMARY OF EXEMPLARY ASPECTS OF THE ADVANCEMENTS

Conventionally, when the crest of the helicoidal screw of one cylindrical member in a lens barrel engages with both a trough of a helicoidal screw and a groove that extends in a circumference direction in an other one of the cylindrical members in the lens barrel, a whole shape of the crest of the helicoidal screw assumes unique shape such as the parallelogram that is cut in a spiral on one part, rather than a column such as a metallic pin or a shape of a circular truncated cone. Therefore, it is difficult to make all the crest of the helicoidal screw in metal.

Therefore, the crest of the helicoidal screw is, conventionally, made with resin that is same as a pipe part of the cylindrical member.

One exemplary aspect of the present invention is directed to a lens barrel that satisfies this need.

Other exemplary aspects include a camera, a digital camera, a portable information terminal and an image input device including the lens barrel therein, respectively.

Reinforcing the crest of the helicoidal screw provides a lens barrel which is hard to be damaged when the lens barrel is shocked in an optical axis direction.

In one exemplary aspect, a lens barrel includes a first cylinder having a trough of a helicoidal screw and a groove formed in a consecutive circumference direction from the trough of the helicoidal screw, in the internal circumference. The lens barrel also includes a second cylinder having a crest of a helicoidal screw that engages with the trough of the helicoidal screw and the groove and formed on outer circumference. A part of the crest of the helicoidal screw includes a reinforcement structure that is a different material from other part of the crest of the helicoidal screw.

As a result of this arrangement, the structure can become hard to be damaged when a cylindrical member receives a shock in an optical axis direction. For example, the machine strength is reinforced by a reinforcing structure of the crest of the helicoidal screw.

As an example, the reinforcement structure can be forced through the second cylinder. As a result of this arrangement, the placement of the reinforcing structure can be enabled without using glue.

In another example, the reinforcement structure is molded with the second cylinder. As a result of this arrangement, the placement of the reinforcing structure can be enabled without needs for glue and a press-fit process.

As an example the reinforcement structure is made with metal materials. As a result of this arrangement, the strength of the reinforcing structure can be secured.

The reinforcement structure can be molded into a cylindrical form or a frusto-conical form. As a result of this arrangement, the processing of the reinforcing structure is easy, further a cost is not increased greatly.

In another exemplary aspect, an end-most portion of the reinforcement structure is located in an imaging side from an imaging side edge of the crest of helicoidal screw with respect to an optical axis direction. As a result of this arrangement, the groove formed a consecutive circumference direction can be coordinated by revising a shape of a reinforcing structure so that the reinforcing structure interferes with the trough of helicoidal screw directly. By doing so, a gap between the first cylindrical member and the second cylindrical member can be reduced.

For example, a gap formed by engagement of the crest of the helicoidal screw and the groove formed in the consecutive circumference direction can be adjustable by changing a size or a shape of the reinforcement structure. As a result of this arrangement, the gap with the groove in a circumference direction can be fine-tuned easily. Further, the gap between the first cylindrical member and the second cylindrical member can be adjusted individually or for every forming die, ideally and easily.

In another aspect, a camera includes the lens barrel. In this aspect, the camera is difficult to be damaged when a cylindrical member of a lens barrel receives a shock in an optical axis direction.

In another aspect, a digital camera includes the lens barrel. In this aspect, the digital camera is difficult to be damaged when a cylindrical member of a lens barrel receives a shock in an optical axis direction.

In another aspect, a portable information terminal includes the lens barrel. In this aspect, the portable information terminal is difficult to be damaged when a cylindrical member of a lens barrel receives a shock in an optical axis direction.

In another aspect, an image input device includes the lens barrel. In this aspect, the image input device is difficult to be damaged when a cylindrical member of a lens barrel receives a shock in an optical axis direction.

According one aspect, the lens barrel includes a crest of the helicoidal screw that includes a reinforcement structure that is a different material from other part of the helicoidal screw. As a result of this arrangement, when a cylindrical member receives a shock in an optical axis direction in the state in which the crest of the helicoidal engages a groove formed a consecutive circumference direction rather than a trough of the helicoidal screw, the lens barrel can be hard to be damaged. In addition, as a result of the lens barrel in this aspect, it can provide high durability and reliability of a camera, a digital camera, a portable information terminal or an image reader.

BRIEF DESCRIPTION OF THE SEVERAL VIEWS OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENTS

Figure 1:
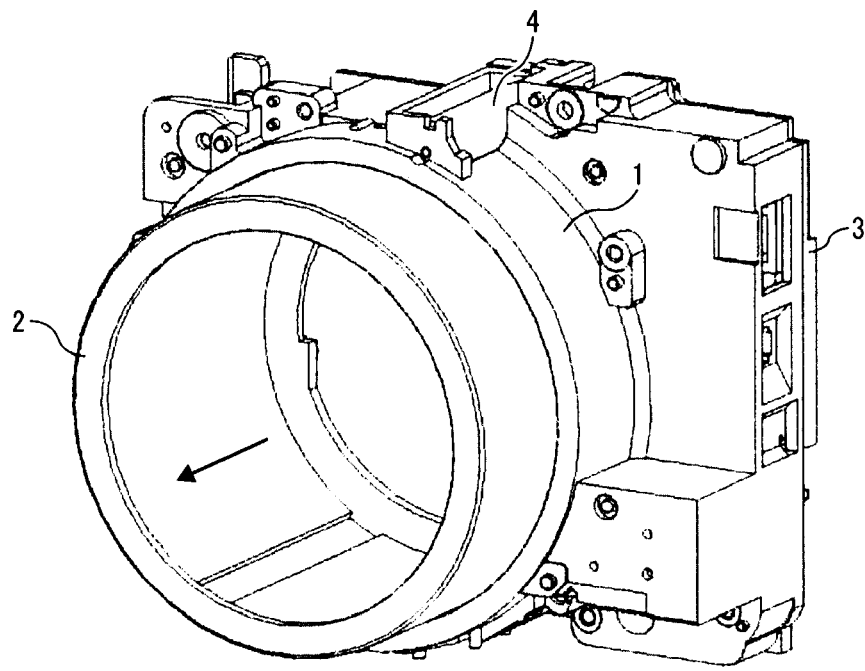
FIG. 1 is a perspective view that illustrates a camera according to an exemplary aspect in which the lens barrel unit is closed.

Referring now to the drawings, wherein like reference numerals designate identical or corresponding parts throughout the several views.

In the Figures:

A reference numeral 1 indicates a fixed cylinder.

A reference numeral 1a indicates a trough of a helicoidal screw that is formed in an internal circumference of the fixed cylinder 1.

A reference numeral 1b indicates a groove that is formed in a circumferential direction of the fixed cylinder 1.

A reference numeral 2 indicates a turn cylinder.

A reference numeral 2a indicates a crest of a helicoidal screw that is formed on a circumference of the turn cylinder 2.

A reference numeral 2b indicates a reinforcement structure that is included in the crest of the helicoidal screw 2a.

A reference numeral 3 indicates a frame.

A reference numeral 4 indicates a drive gear of the turn cylinder 2.

In another aspect, the trough of the helicoidal screw may be formed in the turn cylinder. Furthermore the crest of the helicoidal screw may be formed in the fixed frame.

Figure 8:
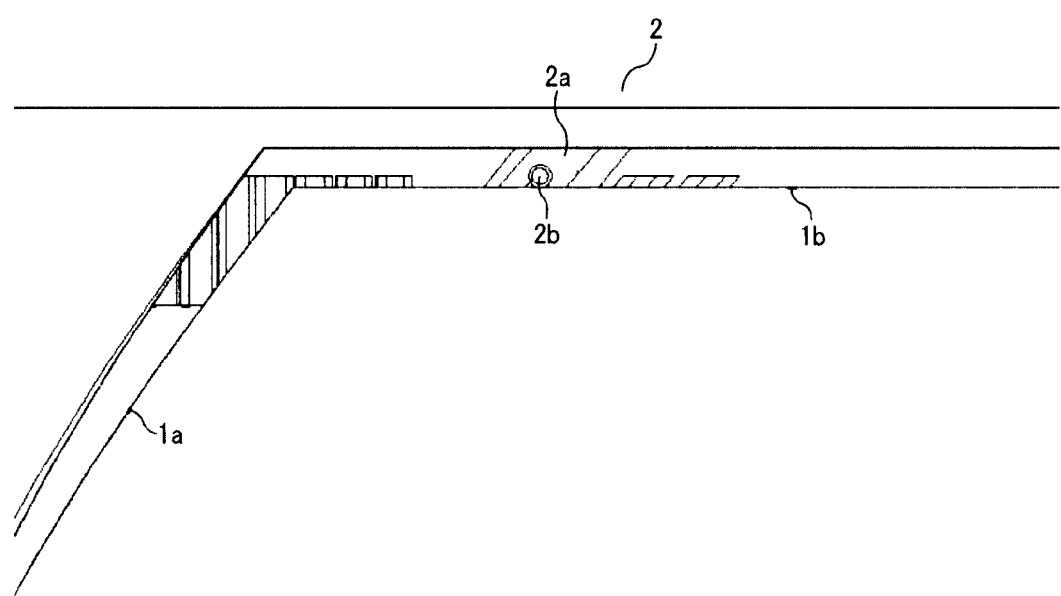
FIG. 8 is an enlarged view of FIG. 7 in which the lens barrel of the exemplary aspect is in a photography position.
Figure 9:
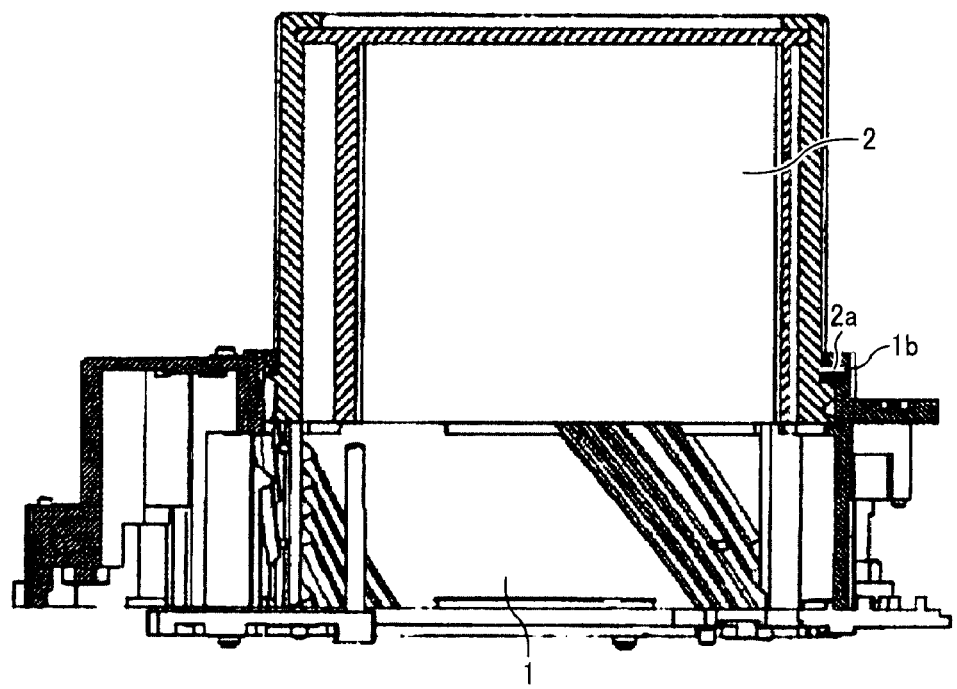
FIG. 9 is a sectional view that illustrates a crest of the helicoidal screw and a reinforcement structure of the turn cylinder in the lens barrel of the exemplary aspect is in a photography position.
Figure 10:
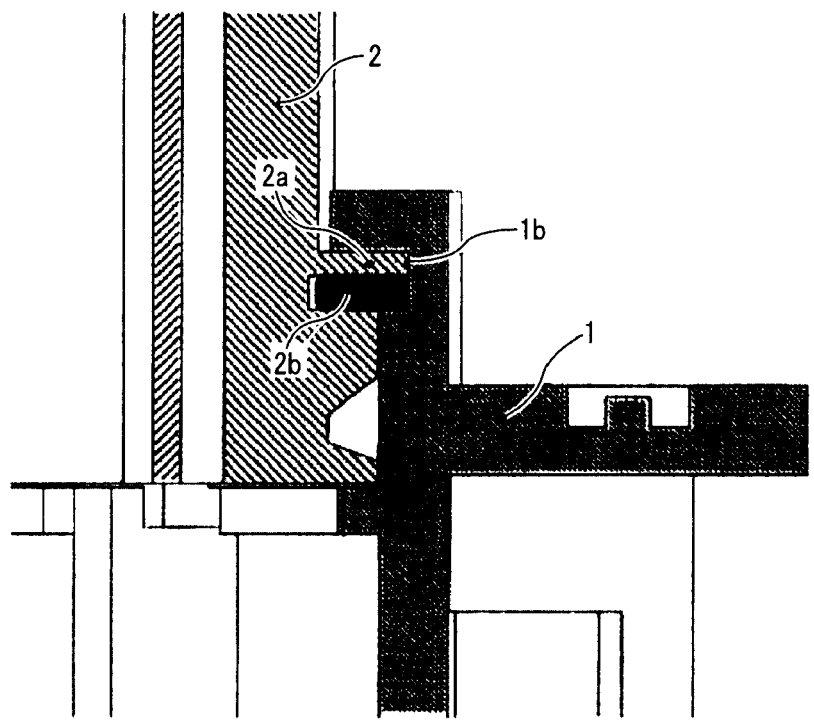
FIG. 10 is an enlarged view of FIG. 9 in which the lens barrel of the exemplary aspect is in the photography position.

In one aspect, the reinforcement structure of the helicoidal screw 2b is made with metal that is press-fitted or molded as one piece, to the crest of the helicoidal screw 2a which is provided every substantially 120 degrees on circumference of the turn cylinder 2, as shown in the FIGS. 8 to 10.

Figure 2:
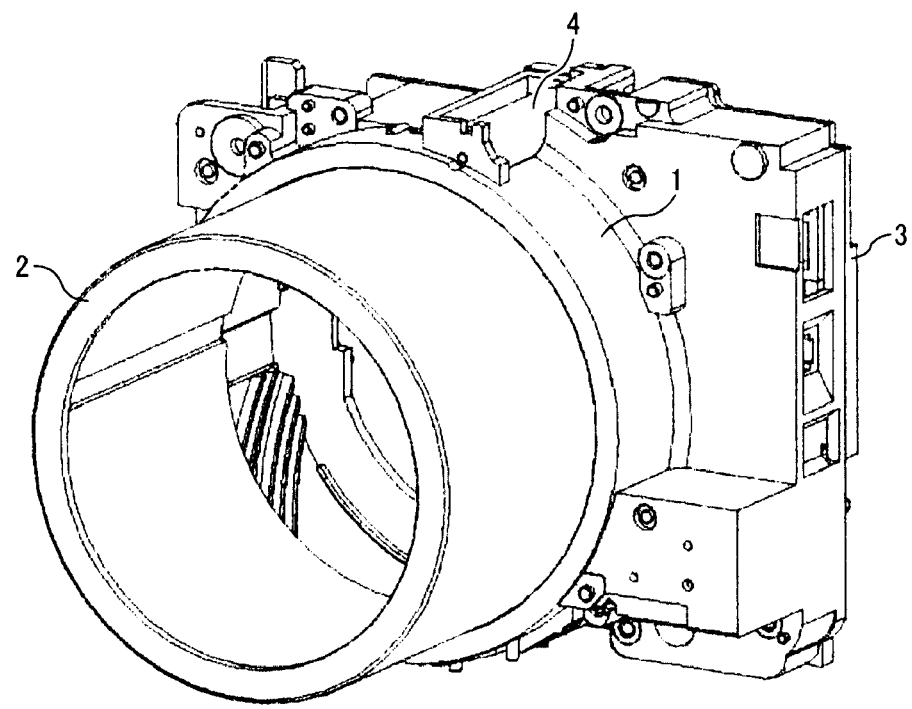
FIG. 2 is a perspective view that illustrates the lens barrel of the exemplary aspect in a photography state.
Figure 3:
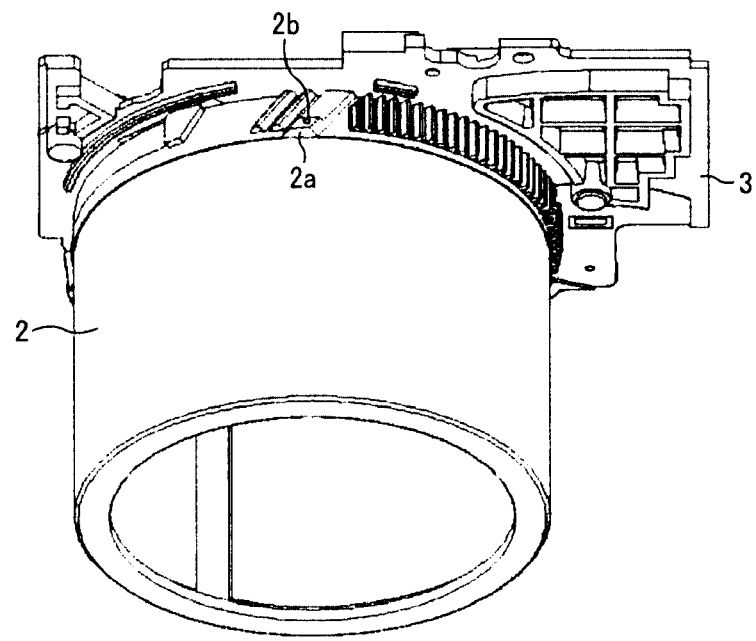
FIG. 3 is a perspective view that illustrates the lens barrel of the exemplary aspect in which a fixed cylinder has been removed, and the lens barrel is in a storing state, as viewed from the upper part.
Figure 4:
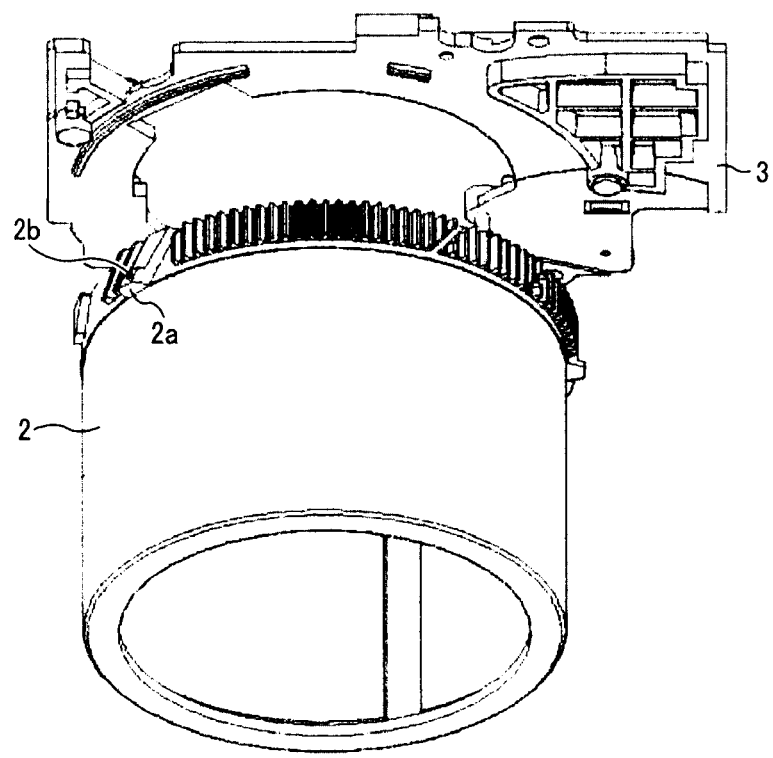
FIG. 4 is a perspective view that illustrates the lens barrel of the exemplary aspect in which the fixed cylinder has been removed, and the lens barrel is in the photography state, as viewed from the upper part.
Figure 5:
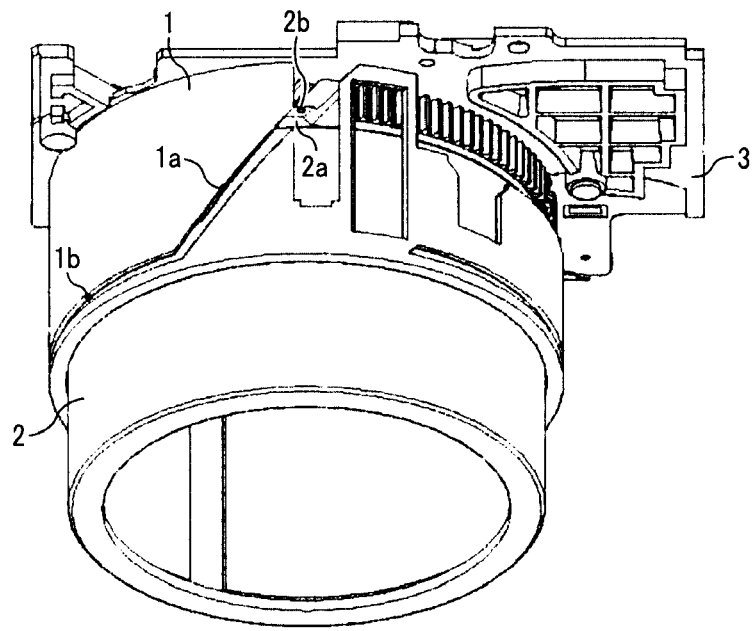
FIG. 5 is a perspective view that illustrates the lens barrel of the exemplary aspect in which an outer side has been removed from a trough of the helicoidal screw on the fixed cylinder, and the lens barrel is in the storing state, as view from the upper part.
Figure 6:
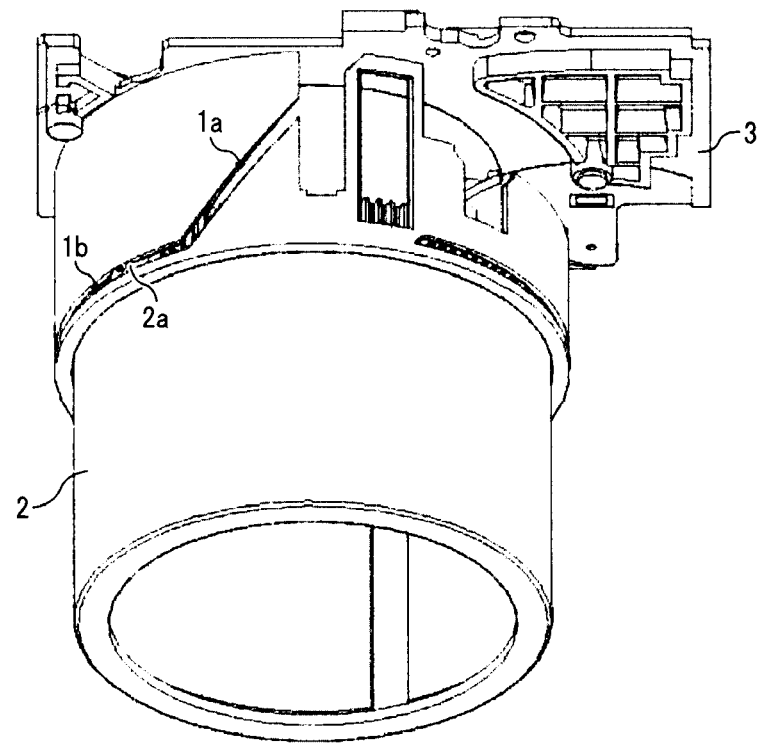
FIG. 6 is a perspective view that illustrates the lens barrel of the exemplary aspect in which an outer side has been removed from the trough of the helicoidal screw on the fixed cylinder, and the lens barrel is in the photography state, as view from the upper part.
Figure 7:
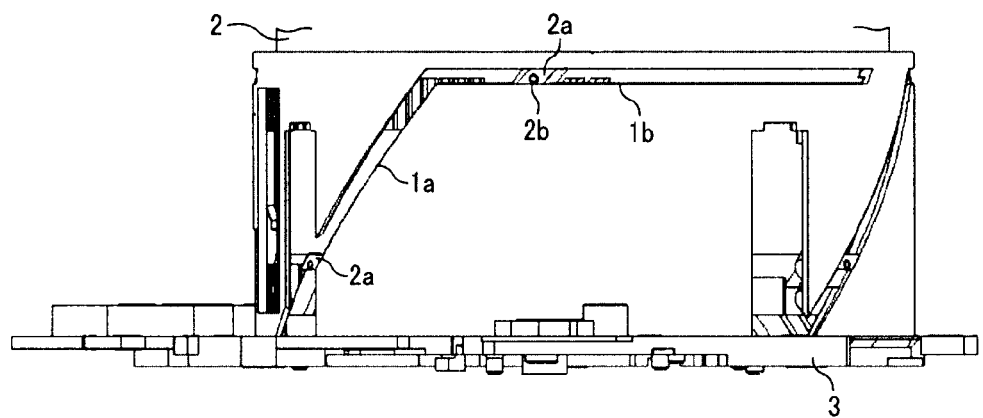
FIG. 7 is a plane view that illustrates an engaging condition of the fixed cylinder and a turn cylinder of the lens barrel of the exemplary aspect.

In the storing position shown FIGS. 1, 3 and 5, the turn cylinder 2 is rotated by the drive gear 4. In the photography position shown FIGS. 2, 4 and 6, the groove 1b formed in a circumference of the fixed frame 1 engages with the crest of the helicoidal screw 2a and the reinforcement structure 2b of the helicoidal screw (see, for example, FIG. 7).

In the photography position, the groove 1b engages with the crest of the helicoidal screw 2a and the reinforcement structure 2b of the helicoidal screw. In this case, the turn cylinder 2 may be forced from a substantially optical axis direction so that it protrudes before the fixed frame 1 (a direction before a camera) when it receives shocks such as fall. In a conventional lens barrel, the crest of the helicoidal screw 2a is often made with resin that is the same as the cylindrical member, and therefore the crest of the helicoidal screw does not include much strength. Furthermore, when the turn cylinder 2 in the photography state increases a fall shock, there is the possibility that the crest of helicoidal screw 2a is broken by a comparatively small amount of force.

By contrast, in the presently described aspect of the lens barrel, the reinforcing structure 2b is press-fitted into the crest of the helicoidal screw 2a, as shown in FIG. 10. In this configuration, the crest of the helicoidal screw 2a is not broken easily.

In addition, a setting position of the reinforcing structure 2b protrudes from an imaging side end, with respect to an optical axis direction of the lens barrel, of the crest of the helicoidal screw 2a. The clearance with the reinforcing structure 2b and the groove 2 can be coordinated by means of revising a shape of the reinforcing structure 2b, without revising a shape of the crest of the helicoidal screw 2a. As a result of this arrangement, the gap between the fixed cylinder 1 and the turn cylinder 2 can be reduced, for example. Because of this, the dispersion of force that can result from, for example as fall shocks, can be increased as against the crest of the helicoidal screw 2a and the reinforcing structure 2b formed every substantially 120 degrees. Further, a strong structure can be realized as against a turn shock.

As an example, a shape of the reinforcing structure 2b is molded in the form of a cylinder or a frusto-conical. As a result of this arrangement, a processing of the reinforcing structure 2b is easy, further a cost is not increased greatly.

By the described structure in the exemplary aspect, the lens barrel becomes hard to be damaged when it receives a force in an optical axis direction in the state engaging the groove formed the consecutive circumference direction without the trough of the helicoidal screw. Furthermore, by means of carrying the lens barrel, it can provide the high crash-worthiness camera, digital camera, portable information terminal and image reader.

The lens barrel can be applied to an analog camera, a digital camera, a portable information terminal, an image input and an other apparatus that uses a lens barrel effectively.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

Obviously, numerous modifications and variations of the present invention are possible in light of the above teachings. It is therefore to be understood that within the scope of the appended claims, the invention may be practiced otherwise than as specifically described herein.

The invention claimed is:

1. A lens barrel comprising:
   a first cylinder that includes
      a helicoidal groove that extends in a helicoidal direction with respect to the first cylinder, and
      a circumferential groove that extends in a circumferential direction with respect to the first cylinder and that extends in continuation with the helicoidal groove; and
   a second cylinder that includes a projection that is configured to engage with the helicoidal groove and the circumferential groove, the projection including a first material, a part of the projection including a reinforcement structure that includes a second material that is different from the first material.

2. A lens barrel as recited in claim 1, wherein the reinforcement structure is formed by being forced through the projection of the second cylinder.

3. A lens barrel as recited in claim 1, wherein the reinforcement structure is formed by being molded with the projection of the second cylinder.

4. A lens barrel as recited in claim 1, wherein the second material of the reinforcement structure is a metal material.

5. A lens barrel as recited in claim 1, wherein the reinforcement structure is a cylindrical form or a frusto-conical form.

6. A lens barrel as recited in claim 1,
   wherein the second cylinder extends in a direction substantially parallel to an optical axis of the lens barrel from an image side of the lens barrel to a subject side of the lens barrel, and
   wherein an end portion of the reinforcement structure is positioned in the projection on an imaging side edge of the projection in the optical axis direction.

7. A lens barrel as recited in claim 1, wherein a gap formed by engagement of the projection and the circumferential groove is configured to be adjusted by changing a size or a shape of the reinforcement structure.

8. A camera comprising the lens barrel as recited in claim 1.

9. A digital camera comprising the lens barrel as recited in claim 1.

10. A portable information terminal comprising the lens barrel as recited in claim 1.

11. An image input device comprising the lens barrel as recited in claim 1.

12. A lens barrel as recited in claim 1, wherein the first cylinder includes the helicoidal groove and the circumferential groove on an interior surface of the first cylinder, and the second cylinder includes the projection on an outer circumference of the second cylinder.

13. A lens barrel comprising:
    a first cylinder that includes
       a helicoidal groove that extends in a helicoidal direction with respect to the first cylinder, and
       a circumferential groove that extends in a circumferential direction with respect to the first cylinder and that extends in continuation with the helicoidal groove;
    a second cylinder that includes a projection that is configured to engage with the helicoidal groove and the circumferential groove, the projection including a first material; and
    means for reinforcing a part of the projection, the means for reinforcing including a second material that is different from the first material.

14. A lens barrel as recited in claim 13, wherein the second material of the means for reinforcing is a metal material.

15. A lens barrel as recited in claim 13,
    wherein the second cylinder extends in a direction substantially parallel to an optical axis of the lens barrel from an image side of the lens barrel to a subject side of the lens barrel, and
    wherein the means for reinforcing is positioned in the projection on an imaging side edge of the projection in the optical axis direction.

16. A lens barrel as recited in claim 13, wherein a gap formed by engagement of the projection and the circumferential groove is configured to be adjusted by changing a size or a shape of the means for reinforcing a part of the projection.

17. A lens barrel as recited in claim 16, wherein the first cylinder includes the helicoidal groove and the circumferential groove on an interior surface of the first cylinder, and the second cylinder includes the projection on an outer circumference of the second cylinder.

18. A method of actuating a lens barrel, comprising:
    rotating a second cylinder relative to a first cylinder by guiding a projection positioned on a surface of the second cylinder in a helicoidal groove included on a surface of the first cylinder so as to translate the second cylinder relative to the first cylinder in a first direction substantially parallel to an optical axis of the lens barrel; and
    rotating the second cylinder relative to the first cylinder by guiding the projection positioned on the surface of the second cylinder in a circumferential groove included on the surface of the first cylinder so as to cause the second cylinder to rotate relative to the first cylinder without translating in the first direction,
    wherein the projection includes a first material, and a part of the projection includes a reinforcement structure that includes a second material that is a different material from the first material.

19. A method as recited in claim 18,
wherein the second cylinder extends in a direction substantially parallel to the optical axis of the lens barrel from an image side of the lens barrel to a subject side of the lens barrel, and
wherein an end portion of the reinforcement structure is positioned on the projection on an imaging side edge of the projection in the optical axis direction.

20. A method as recited in claim 18, wherein a gap formed by engagement of the projection and the circumferential groove is configured to be adjusted by changing a size or a shape of the reinforcement structure.

* * * * *